(12) United States Patent
Kim et al.

(10) Patent No.: US 9,807,777 B2
(45) Date of Patent: Oct. 31, 2017

(54) ANTENNA SWITCHING METHOD

(71) Applicant: Samsung Electronics Co., Ltd., Suwon-si, Gyeonggi-do (KR)

(72) Inventors: Tae Yoon Kim, Seongnam-si (KR); Keon Young Lee, Gwacheon-si (KR); Chae Man Lim, Seoul (KR); Sang Won Kim, Seoul (KR); Yu Shin Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 14/672,835

(22) Filed: Mar. 30, 2015

(65) Prior Publication Data

US 2015/0282196 A1   Oct. 1, 2015

(30) Foreign Application Priority Data

Mar. 28, 2014   (KR) ........................ 10-2014-0037175

(51) Int. Cl.

| | |
|---|---|
| *H04W 28/02* | (2009.01) |
| *H04W 72/08* | (2009.01) |
| *H04B 7/0404* | (2017.01) |
| *H04B 7/06* | (2006.01) |
| *H04L 1/18* | (2006.01) |
| *H04L 5/00* | (2006.01) |
| *H04W 72/02* | (2009.01) |
| *H04W 72/04* | (2009.01) |

(52) U.S. Cl.
CPC ........ *H04W 72/085* (2013.01); *H04B 7/0404* (2013.01); *H04B 7/0608* (2013.01); *H04L 1/1893* (2013.01); *H04L 5/006* (2013.01); *H04L 5/0023* (2013.01); *H04L 5/0055* (2013.01); *H04W 72/02* (2013.01); *H04W 72/046* (2013.01)

(58) Field of Classification Search
None
See application file for complete search history.

(56) References Cited

U.S. PATENT DOCUMENTS

| | | | |
|---|---|---|---|
| 7,660,598 B2 | 2/2010 | Barnett et al. | |
| 2006/0025090 A1* | 2/2006 | Shirakata | H04B 7/0808 455/136 |
| 2006/0135079 A1 | 6/2006 | Barnett et al. | |
| 2013/0157586 A1* | 6/2013 | Saito | H04B 7/0814 455/73 |
| 2013/0225223 A1* | 8/2013 | Nukala | H04W 52/241 455/522 |

(Continued)

FOREIGN PATENT DOCUMENTS

GB    2503504 A    1/2014

*Primary Examiner* — Brandon Renner
(74) *Attorney, Agent, or Firm* — Jefferson IP Law, LLP

(57) ABSTRACT

An antenna switching method of an electronic device is provided. The antenna switching method includes measuring a transmit power variation of a first antenna, monitoring characteristics of received signals of both the first antenna and a second antenna, determining a comparison result by comparing the characteristics of the received signals of both the first antenna and the second antenna when the transmit power variation is greater than or equal to a threshold value, and switching a transmitting antenna based on at least the comparison result.

21 Claims, 9 Drawing Sheets

(56) References Cited

U.S. PATENT DOCUMENTS

| | | | |
|---|---|---|---|
| 2013/0310109 A1* | 11/2013 | Filipovic | H04B 7/0608 |
| | | | 455/553.1 |
| 2014/0023028 A1* | 1/2014 | Zhang | H04W 52/325 |
| | | | 370/329 |
| 2015/0094003 A1* | 4/2015 | Ramkumar | H04B 7/0608 |
| | | | 455/101 |
| 2016/0073354 A1* | 3/2016 | Seo | H04L 5/0073 |
| | | | 455/522 |
| 2016/0286558 A1* | 9/2016 | Chae | H04L 5/0055 |
| 2017/0027011 A1* | 1/2017 | Chae | H04W 8/005 |

* cited by examiner

ANTENNA SWITCHING METHOD

CROSS-REFERENCE TO RELATED APPLICATION(S)

This application claims the benefit under 35 U.S.C. §119(a) of a Korean patent application filed on Mar. 28, 2014 in the Korean Intellectual Property Office and assigned Serial number 10-2014-0037175, the entire disclosure of which is hereby incorporated by reference.

TECHNICAL FIELD

The present disclosure relates to a method of selecting a transmitting antenna for transmitting signals and switching the transmitting antenna rapidly and properly in correspondence to changes in a communication environment in an electronic device having a plurality of antennas mounted therein.

BACKGROUND

As electronic devices, such as smart phones, are developed, various services may be provided to a user. An electronic device may include two or more antennas in order to transmit and receive signals on different frequency bands or improve receive sensitivity of a specific frequency band.

Even though two or more antennas may be used as a receiving antenna, one antenna may be used as a transmitting antenna. For example, when first and second antennas are used as an antenna for receiving a designated frequency band signal, one of the first and second antennas may be used as a transmitting antenna for a corresponding frequency band.

FIG. 1 illustrates an example of an antenna switching method according to the related art.

Referring to FIG. 1, according to the related-art antenna switching method, the signal strength or intensity of a receiving antenna, for example, an antenna (ANT) 0 or an ANT 1, is measured for an amount of time at operation 120 in an electronic device performing an arbitrary function or in an idle state at operation 110. The electronic device compares the signal strength or intensity of signal 0 and signal 1 for a predetermined time at operation 130. When a signal state of signal 0 of the antenna 0 is determined as better than that of a signal state of signal 1 of the antenna 1, the electronic device may determine the antenna 0 as the transmitting antenna at operation 140. On the contrary, the electronic device may determine the antenna 1 as the transmitting antenna at operation 150.

However, a receive sensitivity of an antenna of an electronic device may vary according to a mounted position of the antenna, interference with surrounding components or metal products, the way in which the electronic device is held by a user, and/or a network environment. Generally, the electronic device may perform antenna switching by measuring a sensitivity of a received signal for an amount of time, but when the signal state becomes deteriorated earlier than a measurement time, a problem such as a call drop may occur. In addition, when a mismatch between reception and transmission ends occurs or the reliability of a measurement value for a received signal is lowered, an improper antenna switching may occur.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of allowing an antenna to be switched when a variation of transmit power of a transmitting antenna in an electronic device is measured and the variation increases by an amount greater than or equal to a threshold value.

Another aspect of the present disclosure is to provide an antenna switching method that is rapidly performed and has a high reliability by using transmit power variation based short term monitoring and a received signal, or by using long term monitoring based on an average state of signals received for a predetermined period or feedback information from a base station.

Another aspect of the present disclosure is to provide a switching back method of monitoring a case where switching to a wrong antenna occurs and returning a transmitting antenna to a state before the switching to the wrong antenna occurred.

In accordance with an aspect of the present disclosure, an antenna switching method of an electronic device is provided. The antenna switching method includes measuring a transmit power variation of a first antenna, monitoring characteristics of received signals of both the first antenna and a second antenna, determining a comparison result by comparing the characteristics of the received signals of both the first antenna and the second antenna when the transmit power variation is greater than or equal to a threshold value, and switching a transmitting antenna based on at least the comparison result.

In accordance with an aspect of the present disclosure an electronic device is provided. The electronic device includes a plurality of antennas configured to include an antenna functioning as a transmitting antenna, a transmit power measuring module configured to measure a transmit power of the transmitting antenna, a received signal monitoring module configured to monitor received signal characteristics of signals received by the plurality of antennas, an antenna switching module configured to switch the transmitting antenna to another antenna, and a control module configured to control the antenna switching module to switch the transmitting antenna to the other antenna based on a comparison result of a comparison of the received signal characteristics when a variation of the transmit power is greater than or equal to a threshold value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
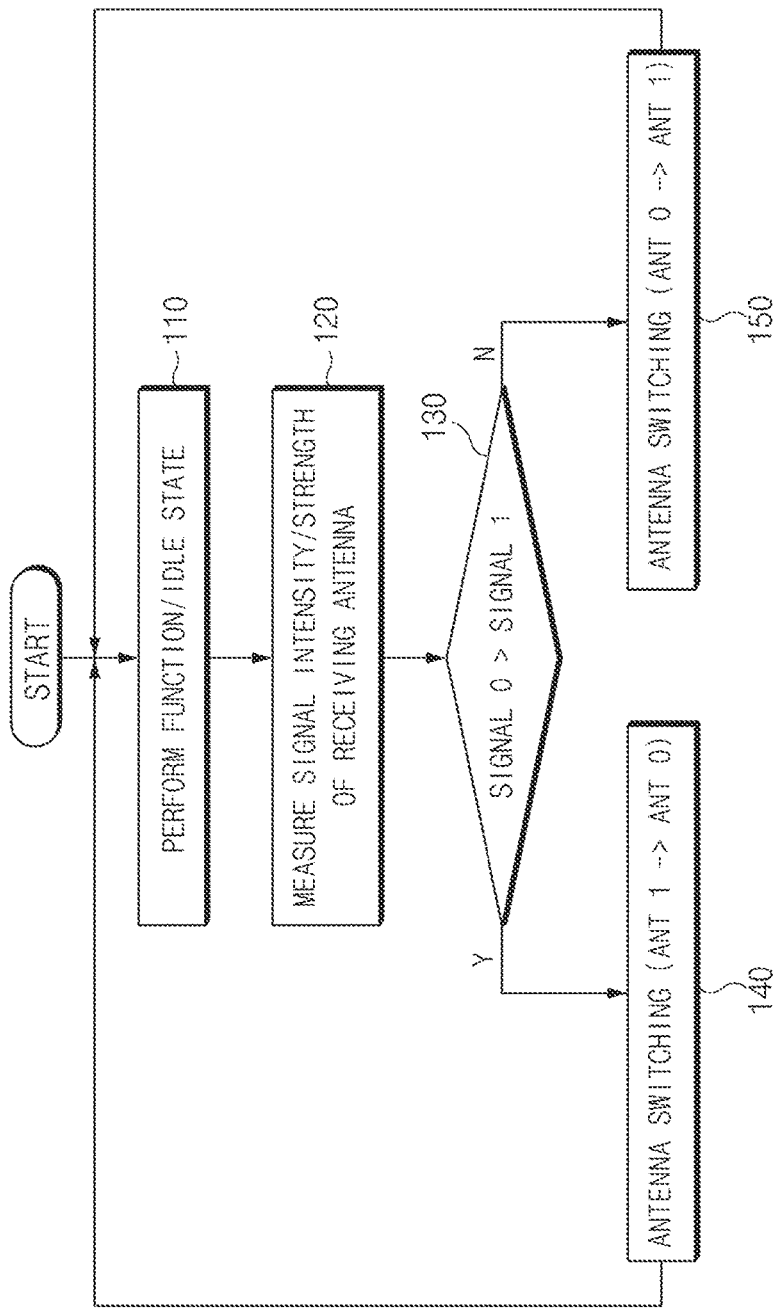
FIG. 1 illustrates an example of an antenna switching method according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," "including," or "comprising" used herein indicate disclosed functions, operations, or existence of elements but do not exclude other functions, operations or elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The meaning of the term "or" used herein includes any combination of the words connected by the term "or". For example, the expression "A or B" may indicate A, B, or both A and B.

The terms such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For instance, without departing the scope of the present disclosure, a first element may be named as a second element, and similarly, a second element may be named as a first element.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is not for delimiting the present disclosure but for describing specific embodiments. Unless otherwise defined, the terms used herein, including technical or scientific terms, have the same meanings as understood by those skilled in the art. The general terms used herein should be interpreted according to the definitions in the dictionary or in the context and should not be interpreted as an excessively contracted meaning.

An electronic device according to the present disclosure may include a communication function. For example, the electronic devices may include at least one of smartphones, tablet personal computers (PCs), mobile phones, video telephones, electronic book readers, desktop PCs, laptop PCs, network computers, personal digital assistants (PDAs), portable multimedia players (PMPs), Motion Picture Experts Group (MPEG) audio layer 3 (MP3) players, mobile medical devices, cameras, wearable devices, e.g., head-mounted-devices (HMDs) such as electronic glasses, electronic apparel, electronic bracelets, electronic necklaces, electronic appcessories, electronic tattoos, and smart watches.

According to various embodiments of the present disclosure, electronic devices may be smart home appliances having communication functions. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes, e.g., Samsung HomeSync™, Apple TV™, or Google TV™, game consoles, electronic dictionaries, electronic keys, camcorders, and electronic picture frames.

According to various embodiments of the present disclosure, electronic devices may include at least one of medical devices, e.g., magnetic resonance angiography (MRA), magnetic resonance imaging (MRI), computed tomography (CT), scanners, and ultrasonic devices, navigation devices, global positioning system (GPS) receivers, event data recorders (EDRs), flight data recorders (FDRs), vehicle infotainment devices, electronic equipment for vessels, e.g., navigation systems and gyrocompasses, avionics, security devices, head units for vehicles, industrial or home robots, automatic teller machines (ATMs), and points of sales (POSs) devices.

According to various embodiments of the present disclosure, electronic devices may include at least one of parts of furniture or buildings/structures having communication functions, electronic boards, electronic signature receiving devices, projectors, and measuring instruments, e.g., water meters, electricity meters, gas meters, and wave meters. Electronic devices according to the present disclosure may be one or more combinations of the above-mentioned devices. Furthermore, electronic devices according to the present disclosure may be flexible devices. In addition, it would be obvious to those skilled in the art that electronic devices according to the present disclosure are not limited to the above-mentioned devices.

Hereinafter, electronic devices according to various embodiments of the present disclosure will be described with reference to the accompanying drawings. The term "user" used herein may refer to a person who uses an electronic device or may refer to a device, e.g., an artificial electronic device that uses an electronic device.

Figure 2:
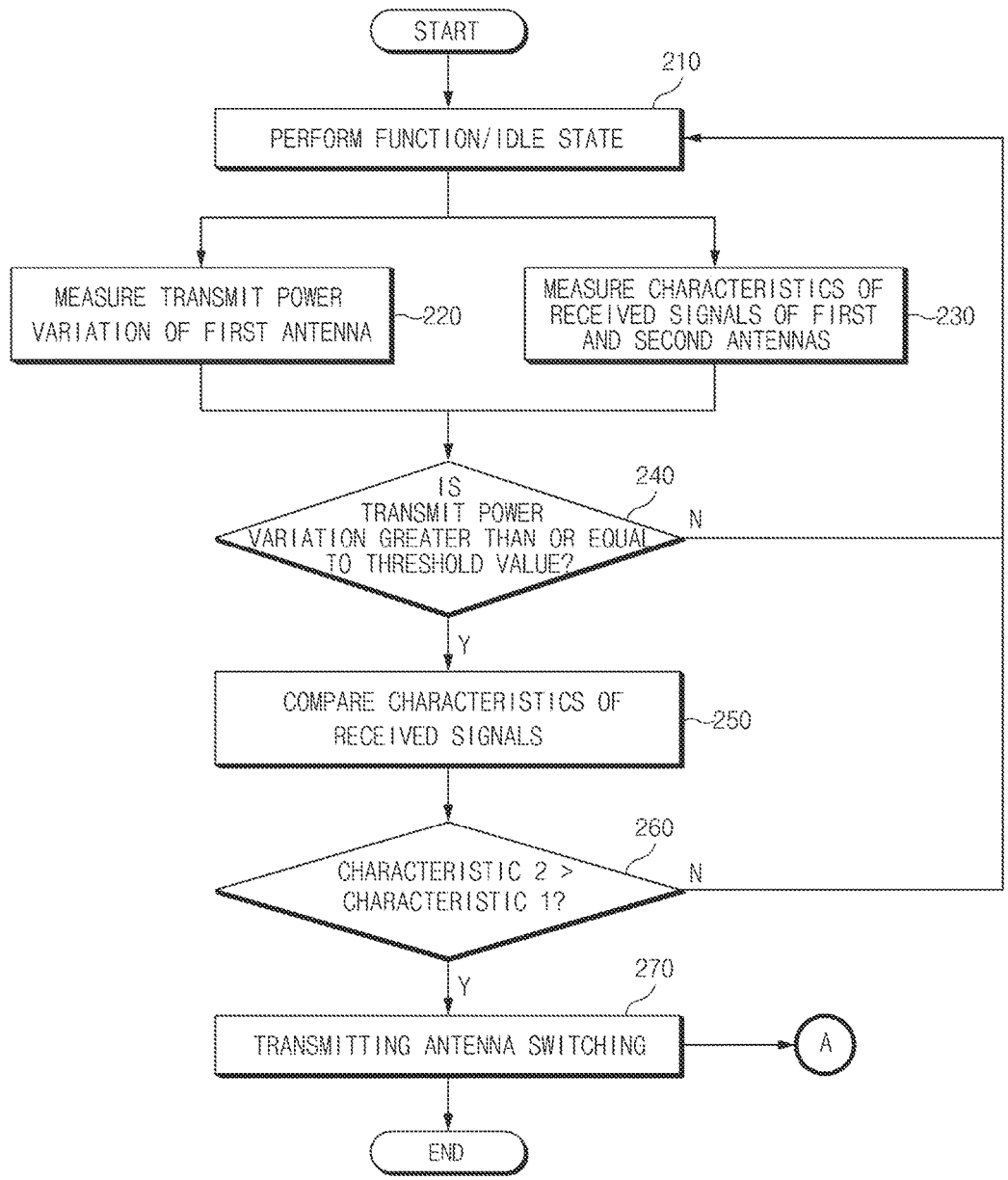
FIG. 2 illustrates an antenna switching process based on a transmit power variation according to various embodiments of the present disclosure.

FIG. 2 illustrates an antenna switching process based on transmit power variation, according to various embodiments of the present disclosure.

In an embodiment to which the process of FIG. 2 is applicable, an electronic device may include a plurality of antennas. In various embodiments of the present disclosure, a first antenna may correspond to an antenna currently being used as a transmitting antenna. A second antenna may correspond to at least one antenna currently not being used as the transmitting antenna. In an example disclosed herein, the second antenna may correspond to one antenna or a plurality of antennas. Switching from the first antenna to the second antenna may include switching to and/or selecting one antenna determined as most proper to be the transmitting antenna from among the plurality of antennas corresponding to the second antenna.

Referring to FIG. 2, in operation 210, an electronic device may perform a function, which may be an arbitrary function, or be in an idle state. For example, the electronic device may be transmitting or receiving data, or in a call. In this state, the electronic device may transmit a signal through a first antenna, and receive a signal through the first antenna and a second antenna.

In operation 220, the electronic device may measure transmit power variation of the first antenna. In various embodiments of the present disclosure, for example, in a long-term evolution (LTE) communication, a data channel, e.g., a physical uplink shared channel (PUSCH), and a control channel. e.g., a physical uplink control channel (PUCCH), are respectively operated for an uplink power control. In various embodiments of the present disclosure, power of a signal transmitted from the first antenna to a base station may include one or more of transmit power of the uplink data channel and transmit power of the uplink control channel. Hereinafter, the PUCCH and PUSCH are described with respect to measuring the transmit power variation in the LTE communication. However, this is for convenience of explanation and a scheme identical, similar, or corresponding to description below may be applied to any system where a base station controls power control information and uplink scheduling.

(1) Method of Measuring a Variation of PUCCH Transmit Power

When the PUCCH is transmitted, a PUCCH transmit power (dBm) may be measured as follows:

$$P_{PUCCH}(i) = \min \begin{cases} P_{CMAX,c}(i), \\ P_{0_{PUCCH}} + PL_C + h(n_{CQI}, n_{HARQ}, n_{SR}) + \\ \Delta_{F_{PUCCH}}(F) + \Delta_{TxD}(F') + g(i) \end{cases} \quad \text{Equation 1}$$

where, $P_{CMAX}$ denotes a configured maximum user equipment (UE) transmit power, $P_{0_{PUCCH}}$ denotes a semi-static base level and may reflect an average interference level, $PL_C$ denotes an estimated downlink path loss $h(n_{CQI}, n_{HARQ}, n_{SR})$, $\Delta_{F_{PUCCH}}$ denote a power offsets based on a PUCCH format, and $\Delta_{TxD}$ denotes a power offset for a PUCCH transmission on two antenna ports.

When the PUCCH is not being transmitted, the electronic device may continuously perform the power control. In this case, the transmit power of the PUCCH may be obtained as follows by omitting parameters $h(n_{CQI}, n_{HARQ}, n_{SR})$, $\Delta_{F_{PUCCH}}$, and $\Delta_{TxD}$:

$$P_{PUCCH}(i) = \min \begin{cases} P_{CMAX,c}(i), \\ P_{0_{PUCCH}} + PL_C + g(i) \end{cases} \quad \text{Equation 2}$$

In the above-mentioned Equation 2, g(i) may be controlled by a transmit power control (TPC) transmitted from the base station. In addition, a transmission mode and scheduling information, such as a PUCCH format, may be included. The electronic device may monitor and control an amount of the PUCCH transmit power for an amount of time, which may be a predetermined amount of time $T_{short}$, in consideration of such information.

In various embodiments of the present disclosure, the electronic device may measure a variation of transmit power. For example, when only the TPC is considered, the variation of the transmit power may be obtained as $$\Delta_{PUCCH} = \sum_{1}^{N} TPC.$$

In various embodiments of the present disclosure, when the TPC and the uplink scheduling information are considered together, the variation of the transmit power may be obtained as $\Delta_{PUCCH} = \Sigma(P_{prv} - P_{new})$, where $P_{prv}$ denotes a previous PUCCH transmit power and $P_{new}$ denotes a currently controlled PUCCH transmit power.

(2) Method of Measuring a Variation of PUSCH Transmit Power.

When only the PUSCH is transmitted, the PUSCH transmit power (dBm) may be obtained as follows:

$$P_{PUSCH}(i) = \min \begin{cases} P_{CMAX,c}(i), \\ 10\log_{10}(M_{PUSCH,c}(i)) + P_{0_{PUSCH,c}}(j) + \\ \alpha_c(j) \cdot PL_C + \Delta_{TF,c}(i) + f_c(i) \end{cases} \quad \text{Equation 3}$$

When the PUSCH and PUCCH are simultaneously transmitted, the PUSCH transmit power may be obtained as follows:

$$P_{PUSCH}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{0_{PUSCH,c}}(j) + \\ \alpha_c(j) \cdot PL_C + \Delta_{TF,c}(i) + f_c(i) \end{cases} \quad \text{Equation 4}$$

When PUSCH is not transmitted, the PUSCH transmit power may be obtained as follows:

$$P_{PUSCH}(i) = \min \begin{cases} P_{CMAX,c}(i), \\ P_{0_{PUSCH,c}}(1) + \alpha_c(1) \cdot PL_C + f_c(i) \end{cases} \quad \text{Equation 5}$$

where, $P_{CMAX}$ denotes a configured maximum UE transmit power, $M_{PUSCH}$ denotes an assigned and/or allocated number of resource blocks (RBs) for the PUSCH, $P_{0PUSCH}$ denotes a semi-static base level and may reflect an average interference level, $\alpha_c$ denotes a path loss compensation factor, and $\Delta_{TF,c}$ denotes a modulation and coding scheme (MCS) based control parameter.

In various embodiments of the present disclosure, for the PUSCH, $f_c(i)$ denotes a parameter controlled by the TPC, and the MCS and a transmit power variation according to the number of allocated RBs may be considered together. In consideration of such information, the electronic device may monitor an actual control amount of the PUSCH transmit power for an amount of time, e.g., $T_{short}$.

In various embodiments of the present disclosure, the electronic device may measure a variation of transmit power. For example, when only the TPC is considered, the variation of the transmit power may be obtained as $$\Delta_{PUSCH} = \sum_{1}^{N} TPC.$$

In various embodiments of the present disclosure, when the TPC and the scheduling information are considered together, the variation of the transmit power may be obtained as $\Delta_{PUCCH} = \Sigma(P_{prv} - P_{new})$, where the $P_{prv}$ denotes the previous PUSCH transmit power and $P_{new}$ denotes the currently controlled PUSCH transmit power.

In various embodiments of the present disclosure, a part of uplink scheduling information may be selectively considered together with the TPC. For example, when only an effect of the transmit power per RB is desired to be determined, regardless of an RB variation, the electronic device may determine the variation of the transmit power by using a value that the variation, e.g., $M_{PUSCH, c(i)}$, by the RB is removed from the equation used to determine the uplink transmit power of the PUSCH. In this case, the variation of the transmit power may be obtained as $\Delta_{PUCCH} = \Sigma(P_{prv\_sel} - P_{new\_sel})$, where $P_{prv\_sel}$ denotes previous PUSCH transmit power generated by using the TPC and the selected uplink scheduling information, and $P_{new\_sel}$ denotes currently controlled PUSCH transmit power generated in the same scheme.

In various embodiments of the present disclosure, $\Delta_{PUCCH}$ and $\Delta_{PUSCH}$ may be calculated every time a corresponding TPC is received. A variation M of the transmit power, which may also be referred to as a transmit power variation, generated in a transmitting antenna may be measured based on power control information and scheduling information on at least one channel. For example, the electronic device may determine the transmit power variation for an uplink control channel, e.g., a PUCCH, and/or an uplink data channel, e.g., a PUSCH. For example, when only $\Delta_{PUCCH}$ is considered, $M = \Delta_{PUCCH}$. When only $\Delta_{PUSCH}$ is considered, $M = \Delta_{PUSCH}$. When both of $\Delta_{PUCCH}$ and $\Delta_{PUSCH}$ are considered, $M = f(\Delta_{PUCCH}, \Delta_{PUSCH})$. Here, $f(\Delta_{PUCCH}, \Delta_{PUSCH})$ is a scheme for determining the transmit power variation by using $\Delta_{PUCCH}$ and $\Delta_{PUSCH}$, and includes an operation such as an average of the two values or a weighted average based on the number of times, which may be $N_{PUCCH}$, and/or $N_{PUSCH}$, that the TPC is received, or summing of the two values.

Referring to FIG. 2 again, in operation 230, the electronic device may measure characteristics of received signals of the first and second antennas. Operation 230 may be performed simultaneously or in the same period with operation 220. Or operation 230 may be performed in some period different from the period in which operation 220 is performed. For example, operations 230 and 220 may be performed by taking, as a single period, a period from when an immediately previous TPC is received to when a current TPC is received.

In operation 230, the electronic device may measure various characteristics of the received signal. For example, the electronic device may measure sensitivity, intensity, or quality of the received signal. In order to determine characteristics of a signal received through the first or second antenna, the electronic device may determine a reference signal received power (RSRP), a received signal strength indicator (RSSI), a reference signal received quality (RSRQ), or any other similar and/or suitable characteristic of the received signal. In the description below, characteristics of a signal received through the first antenna being better than those of a signal received through the second antenna may indicate that strength or quality of the signal received through the first antenna shows a higher value than that of the signal received through the second antenna.

In operation 240, the electronic device may determine whether a variation of the measured transmit power is greater than or equal to a threshold value. Here, the threshold value may be predefined in the electronic device or set by a base station. In addition, the threshold value may be determined according to characteristics of the antenna. In operation 240, when the transmit power variation is not greater than or equal to the threshold value, the electronic device may continuously perform a function without antenna switching or may maintain an idle state, e.g., operation 210. When the transmit power variation is greater than the threshold value, the electronic device may perform operation 250.

In operation 250, the electronic device may compare characteristics of the received signals of the first and second antennas, which are measured in operation 230. The characteristics of the received signals may be represented as factors such as intensity or quality of the received signal, or the above-described RSRP, RSSI, or RSRQ. However, the received signal characteristics are not limited thereto, and may include various kinds of factors for determining whether the received signal characteristics are relatively good.

In operation 260, the electronic device determines whether the received signal characteristics of the second antenna, e.g., a characteristic 2, are better, or in other words greater, than the received signal characteristic of the first antenna, e.g., a characteristic 1, and if so, the electronic device may perform operation 270. When the received signal characteristics of the first antenna are better than those of the second antenna, the electronic device may allow the first antenna to continuously operate as the transmitting antenna without antenna switching.

In operation 270, the electronic device may allow signal transmission currently performed by the first antenna to be performed by the second antenna, or in other words, the electronic device may perform a transmitting antenna switching operation. In other words, the transmitting antenna may be switched from the first antenna to the second antenna. Then, the electronic device may terminate the antenna switching process, or proceed to a process A and determine whether the antenna switching is normally performed. Description in relation to the process A will be made later with reference to FIG. 3.

In various embodiments of the present disclosure, determining transmit power variation based on the scheduling information together with power control information in an electronic device are advantageous in various aspects. According to various embodiments of the present disclosure, if a current state of the transmitting antenna is not good, the electronic device may switch another antenna included in the electronic device as the transmitting antenna. Typically, when a state of an antenna is not good and sensitivities of transmission and reception signals become lowered, the base station may perform a power control for the electronic device and allow the electronic device to increase the transmit power.

However, the base station may derive an effect of increasing the transmit power of the electronic device by changing only the scheduling information without changing the power control information. For example, the base station may enhance transmit performance of the electronic device by using a scheme of lowering an MCS, a scheme of changing an allocated RB, or lowering an effective coding rate (ECR), by changing the scheduling information.

When only power control information is monitored in an electronic device, the electronic device may grasp only a part of a situation, for example a need for improvement of transmit performance through a power control, when a base station needs higher transmit power from a terminal because an antenna state is not good, and accurate monitoring is not performed on other cases, such as improvement of transmit performance by changing scheduling information. According to various embodiments of the present disclosure, the electronic device may accurately grasp whether the base station needs higher transmit performance from the electronic device or whether an antenna is to be switched by using the power control information and the scheduling information together.

Figure 3:
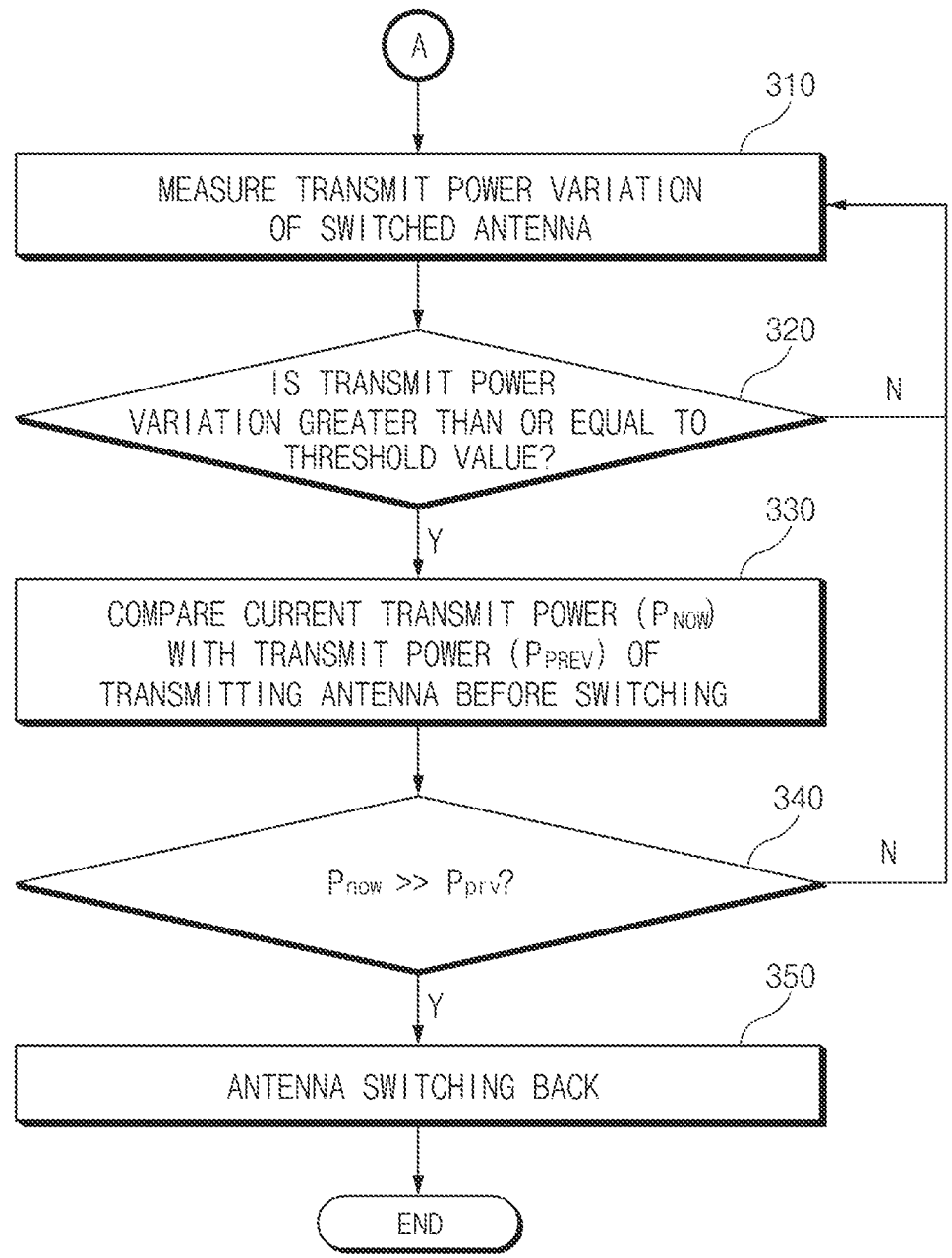
FIG. 3 illustrates an antenna switching back process according to various embodiments of the present disclosure.

FIG. 3 illustrates an antenna switching back process according to various embodiments of the present disclosure.

The process illustrated in FIG. 3 may be understood as a follow-up process of operation 270 of FIG. 2. However, in various embodiments of the present disclosure, the process illustrated in FIG. 3 may be understood as a follow-up process for an arbitrary antenna switching situation in regardless of FIG. 2.

In operation 310, the electronic device may measure transmit power variation of a switched antenna. The measurement of the transmit power variation performed in operation 310 may be performed in an identical, similar, or corresponding manner to the measurement scheme in operation 220 of FIG. 2.

In operation 320, the electronic device may determine whether the transmit power variation is greater than or equal to a threshold value. The threshold value in operation 320 may be different from one in operation 240.

Referring to FIG. 2, when the transmit power of the first antenna is continuously increased and the transmit power variation begins to exceed the threshold value, e.g., the transmit power variation increased from level 2 to level 5, the antenna switching from the first antenna to the second antenna may occur. Once the switching occurs, since the electronic device may have determined that a transmission and reception state of the switched antenna, e.g., the second antenna, is better than that of the antenna, e.g., the first antenna, before the switching, the electronic device does not continuously maintain the transmit power of the switched antenna to be high, like the transmit power, e.g., level 5, of the first antenna before the switching, and may adjust the transmit power down to another level, e.g., level 4. However, in a case where the antenna switching is not proper, since the transmit power of the switched antenna, e.g., the second antenna, which is adjusted downward, does not sufficiently satisfy transmission intensity or quality, a base station may change power control or scheduling information to allow the transmit power of the switched antenna to be continuously increased. In this case, even though the transmit power of the switched antenna is less increased than the threshold value in operation 220, e.g., two step increase from level 4 to level 6, the electronic device may determine whether the antenna is wrongly switched with reference to a separate criterion.

In operation 320, when the variation of the transmit power does not reach a designated threshold value, the electronic device may continuously perform operation 310 or, when a sufficient and/or designated amount of time has passed, proceed to operation 210 to perform a specific function or be in an idle state. In operation 320, when the variation of the transmit power is more than or equal to the designated threshold value, the electronic device may proceed to operation 330.

In operation 330, the electronic device may compare a current transmit power, e.g., level 6 of the second antenna, with a transmit power of the transmitting antenna before the switching, e.g., level 5 of the first antenna. For the comparison, when the antenna switching is performed, the electronic device may store transmit power values of PUCCH and/or PUSCH, e.g., $P_{PUCCH}$ and $P_{PUSCH}$, before the switching. In various embodiments of the present disclosure, the electronic device may measure the variation of the transmit power, e.g., operation 310, for $T_{check}$ time, may store the transmit power values after the $T_{check}$ time, and may use them for the comparison.

In operation 340, when the current transmit power, $P_{now}$, is higher than that of a previous transmit power, $P_{prv}$, from immediately before the switching by a predetermined level, the electronic device may proceed to operation 350. Otherwise, the electronic device may proceed to operation 310 or operation 210. In various embodiments of the present disclosure, only if the current transmit power is higher than that of immediately before the switching, the electronic device may proceed to operation 350.

In operation 350, the electronic device may return the antenna to a state before the switching, or in other words, may perform an antenna switching back operation. When the antenna is switched back, processes from operation 210 to 270 in FIG. 2 may be performed. In various embodiments of the present disclosure, since reception intensity of a signal and quality state may be frequently and suddenly changed, once the antenna is switched back, the antenna switching processes, e.g., FIG. 2, FIG. 3, or processes in FIGS. 4 to 7 to be described, may not be performed in the electronic device for a designated time.

Figure 4:
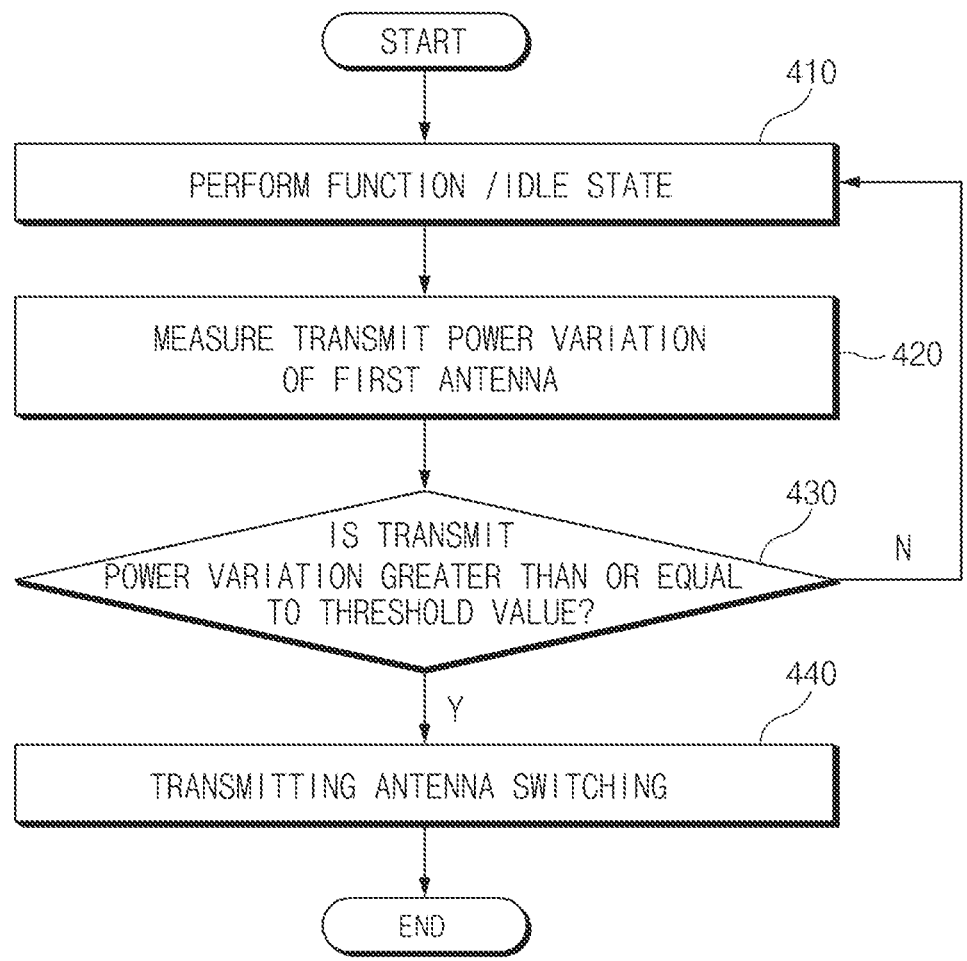
FIG. 4 illustrates another antenna switching process based on a transmit power variation according to various embodiments of the present disclosure.

FIG. 4 illustrates another antenna switching process based on a transmit power variation according to various embodiments of the present disclosure. Hereinafter, description of subject matter identical, similar, or corresponding to the above-described one will be omitted.

Referring to FIG. 4, in operation 410, the electronic device may perform a function or be in an idle state. According to an embodiment of FIG. 4, the electronic device may include a plurality of antennas, and use a first antenna as a transmitting antenna.

In operation 420, the electronic device may measure a transmit power variation of the first antenna. Operation 420 may be performed based on a method described in relation to operation 220. For example, the electronic device may measure a transmit power variation based on power control information and scheduling information for at least one channel, e.g., a PUCCH, and/or a PUSCH. In addition, the electronic device may selectively use a part of a plurality of parameters configuring the scheduling information and measure the transmit power variation.

In operation 430, the electronic device may determine whether the transmit power variation is greater than or equal to a threshold value. When the transmit power variation increases to the threshold value or greater, the electronic device may switch the transmitting antenna, e.g., switch from the first antenna to the second antenna, in operation 440.

The process illustrated in FIG. 4 has the following difference from the one illustrated in FIG. 2. In the process illustrated in FIG. 2, when the transmit power is greater than or equal to a threshold vale, e.g., the threshold value 1, the electronic device may determine whether to switch the transmitting antenna based on the measured characteristics of the received signal. In other words, according to the process of FIG. 2, even though the transmit power variation is not smaller than the threshold value, if characteristics of the received signal of the current transmitting antenna, e.g., the first antenna, are good, the antenna switching may not be performed in the electronic device.

On the other hand, when the transmit power is greater than or equal to, a threshold value, e.g., the threshold value 2, in the process of FIG. 4, antenna switching is performed. Accordingly, the antenna switching according to the process of FIG. 4 may be more rapidly performed than that according to the process of FIG. 2. A probability that the antenna switching back occurs in the electronic device becomes lowered in the process of FIG. 2 compared to the process of FIG. 4.

In various embodiments of the present disclosure, in order to allow the antenna switching to selectively or efficiently occur, the threshold value, e.g., threshold value 1 or threshold value 2, may be properly adjusted. For example, the threshold value 2 may be a reference value used to determine that the first antenna may not be a transmitting antenna. In this case, it may have meaning that antenna switching is performed without comparison between characteristics of received signals in the electronic device.

Figure 5:
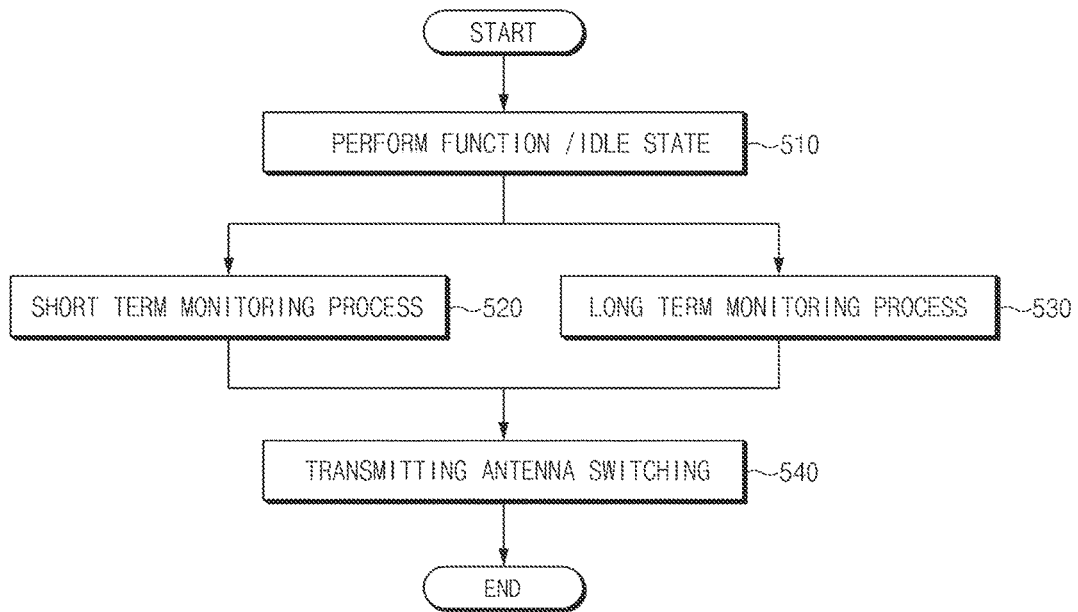
FIG. 5 illustrates an antenna switching process based on short term monitoring and long term monitoring according to various embodiments of the present disclosure.

FIG. 5 illustrates an antenna switching process based on short-term monitoring and long-term monitoring according to various embodiments of the present disclosure.

According to various embodiments of the present disclosure, different processes may be performed in parallel to efficiently perform the transmitting antenna switching. A monitoring process having a relatively short period, for example, a short-term, e.g., $T_{short}$=200 ms, monitoring process performed every time the TPC is received and a long-term process, e.g., $T_{long}$=500 ms, determining average strength or quality of a signal received for a predetermined time may be performed in parallel.

In operation 510, the electronic device may perform a function or be in an idle state. The electronic device may perform operation 520, to perform a short term monitoring process, and operation 530, to perform a long term monitoring process, in parallel which have different periods. For example, operation 520 may correspond to the operations 220 to 260 of FIG. 2, which are described above. Alternatively, operation 520 may correspond to the operations 420 and 430 of FIG. 4, which are described above. Operation 530 may correspond to a process to be disclosed in FIGS. 6 and 7.

In operation 540, the electronic device may perform a transmitting antenna switching operation based on at least one of results of operations 520 and 530. Through the parallel monitoring of operations 520 and 530, the electronic device may implement antenna switching which is relatively rapid and reliable. In addition, when the antenna switching occurs by any one process of the two, a switching restriction time may be applied for preventing too frequent antenna switching, or in other words, may prevent the transmitting antenna switching operation for occurring too frequently. For example, in a case where the antenna switching occurs by operation 520, even though a switching event by operation 530 occurs for a designated switching time, e.g., 5000 ms, the switching event may be neglected.

When the switching by operation 540 occurs, the process may proceed to operation 510 or an antenna switching back process, e.g., operations 310 to 350, may be performed.

Figure 6:
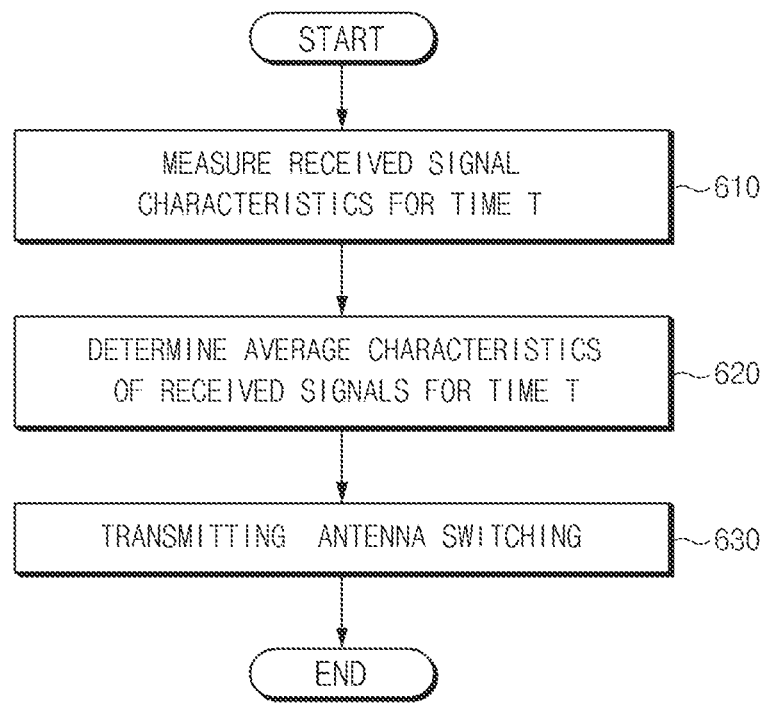
FIG. 6 illustrates an antenna switching process based on average characteristics of received signals according to various embodiments of the present disclosure.

FIG. 6 illustrates an antenna switching process based on average characteristics of a received signal according to various embodiments of the present disclosure.

Referring to FIG. 6, in operation 610, the electronic device may measure characteristics of signals, of a plurality of antennas, received for a time T, e.g., $T_{long}$. In various embodiments of the present disclosure, the electronic device may obtain strength or quality of the signal received for the time T.

In operation 620, the electronic device may determine average characteristics of the signals received for the time T via the plurality of antennas. For example, the electronic device may calculate the following value:

$$H = g(RXmetric1_{long}, RXmetric2_{long}) \qquad \text{Equation 6}$$

where, $RXmetric1_{long}$ and $RXmetric2_{long}$ respectively denote characteristics, e.g., strength, quality, state, etc., of received signals received by the first and second antennas for the time T.

Here, $H=g(RXmetric1_{long}, RXmetric2_{long})$ indicates a scheme for determining a transmit power variation and may include an operation of obtaining an average of or a difference between two values by using $RXmetric1_{long}$ and $RXmetric2_{long}$. The electronic device may compare H with a defined value or may, in operation 630, switch the transmitting antenna, i.e., perform a transmitting antenna switching operation, to an antenna having better characteristics of the received signal in other various schemes.

Figure 7:
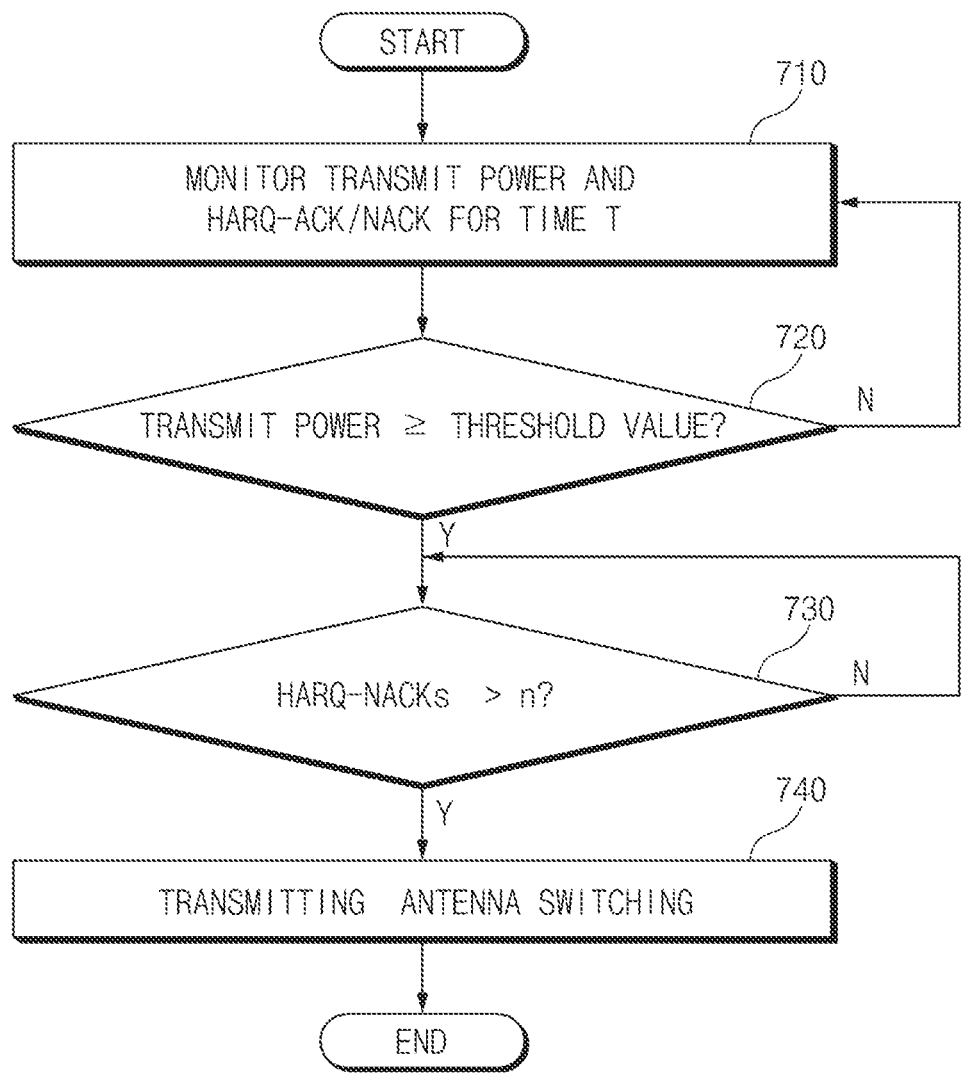
FIG. 7 illustrates an antenna switching process based on feedback information according to various embodiments of the present disclosure.

FIG. 7 illustrates an antenna switching process based on feedback information according to various embodiments of the present disclosure.

A base station may notify an electronic device of whether data, or a signal transmitted in an uplink from the electronic device, is successfully received after a predetermined time has passed, through a downlink. The electronic device may determine whether to retransmit corresponding data or a signal based on this feedback. For example, for LTE communication, a base station may transmit a hybrid automatic retransmit request (HARQ)—acknowledgement (ACK)/negative ACK (HACK) value to an electronic device through a downlink physical HARQ indicator channel (PHICH) for all data transmitted by the electronic device through a PUSCH.

Referring to FIG. 7, in operation 710, the electronic device may monitor transmit power and the HARQ-ACK/NACK, i.e., may monitor whether the HARQ-ACK/NACK is received, for a time T, e.g., $T_{long}$. Receiving the HARQ-NACK consecutively indicates that the uplink channel state of the electronic device is not good. In other words, if received data corresponds to NACK, the electronic device may determine that the uplink channel state is not good and antenna switching is needed. In this case, the base station may try to make the transmission state better by changing a power control or scheduling information for the electronic device. However, when the HARQ-NACK is consecutively received in a state where transmit power of the terminal is greater than a predetermined level, the electronic device may determine that an antenna that currently used as a transmitting antenna, e.g., the first antenna, is not proper any longer as the transmitting antenna.

In operation 720, the electronic device may determine whether transmit power is the same or greater than a threshold value. The threshold value may be a value that the transmit power of the transmitting antenna may not be increased beyond through adjustment of the power control or scheduling information, or may be a transmit power value smaller than the value by a predetermined level. When the transmit power is higher than or equal to the threshold value, the process proceeds to operation 730. Otherwise, the process proceeds to operation 710 and the electronic device may continuously perform monitoring.

When the transmit power is higher than the threshold value, in operation 730, the electronic device may determine whether the number of the HARQ-NACKs received for the time T is the same or greater than a number, e.g., n, or whether the number of the HARQ-NACKs consecutively received is the same or greater than the number. In this case, when the number of the HARQ-NACKs received for the time T or received consecutively is the same or greater than the number, the process may proceed to operation 740.

In operation 740, the electronic device may perform a transmitting antenna switching operation. Operation 740 may correspond to operation 540. In various embodiments of the present disclosure, processes described in relation to different drawings may be combined and performed. For example, the antenna switched in operation 740 may be an antenna determined as the antenna of which a signal reception state is better through operations 610 and 620 in FIG. 6.

According to various embodiments of the present disclosure, an antenna switching method of an electronic device may include an operation of measuring a transmit power variation of the first antenna, an operation of monitoring characteristics of signals received by the first and second antennas, an operation of comparing the received signal characteristics of the first and second antennas when the transmit power variation is not smaller than the threshold value; and an operation of switching an transmitting antenna based on at least the comparison result.

According to various embodiments of the present disclosure, the operation of measuring the transmit power variation may be to measure the transmit power variation based on power control information and scheduling information for at least one channel.

According to various embodiments of the present disclosure, the operation of measuring the transmit power variation may be to measure the transmit power variation based on the entirety of or a part of uplink scheduling parameters included in the scheduling information. In addition, the at least one channel may include at least one of an uplink control channel and an uplink data channel. In addition, the at least one channel may include at least one of a PUCCH and a PUSCH in an LTE communication network.

According to various embodiments of the present disclosure, the operation of monitoring the characteristics of the received signals may be monitoring intensity or quality of signals received through the first and second antennas.

According to various embodiments of the present disclosure, the characteristics of the received signals may be at least one of RSRPs, RSSIs, and RSRQs of signals received through the first and second antennas.

According to various embodiments of the present disclosure, the operation of switching the transmitting antenna may include an operation of maintaining the transmitting antenna as the first antenna when intensity or quality of a signal received by the first antenna is determined as higher than that of a signal received by the second antenna from the comparison result, or switching the transmitting antenna from the first antenna to the second antenna when the intensity or quality of the signal received by the second antenna is determined as higher than that of the signal received by the first antenna from the comparison result.

According to various embodiments of the present disclosure, the operation of measuring the transmit power variation and the operation of monitoring the characteristics of the received signals are performed for a first period. The method may further include an operation of monitoring characteristics of received signals of the first and second antennas for a second period which is longer than the first period and an operation of obtaining average values of the characteristics of the received signals monitored for the second period. The operation of switching the transmitting antenna may be further performed based on the comparison result and the average values of the received signal characteristics.

According to various embodiments of the present disclosure, the method may further include an operation of determining whether the transmit power of the first antenna is not smaller than a threshold value, and an operation of determining the number of times of occurrences of a designated feedback received from a base station, when the transmit power is not smaller than the threshold value, wherein the switching of the transmitting antenna may be further performed based on the comparison result and the number of times of occurrences.

According to various embodiments of the present disclosure, the designated feedback may be the HARQ-NACK.

According to various embodiments of the present disclosure, the method may further include an operation of measuring a transmit power variation of the transmitting antenna after the switching, an operation of comparing current transmit power and transmit power immediately before the switching, when the transmit power variation measured after the switching is increased by a designated value or greater, and an operation of switching the transmitting antenna back to a transmitting antenna before the switching based on the comparison result.

According to various embodiments of the present disclosure, the switching back operation may be performed in a case where current transmit power is higher than that before the switching by a designated power value.

Figure 8:
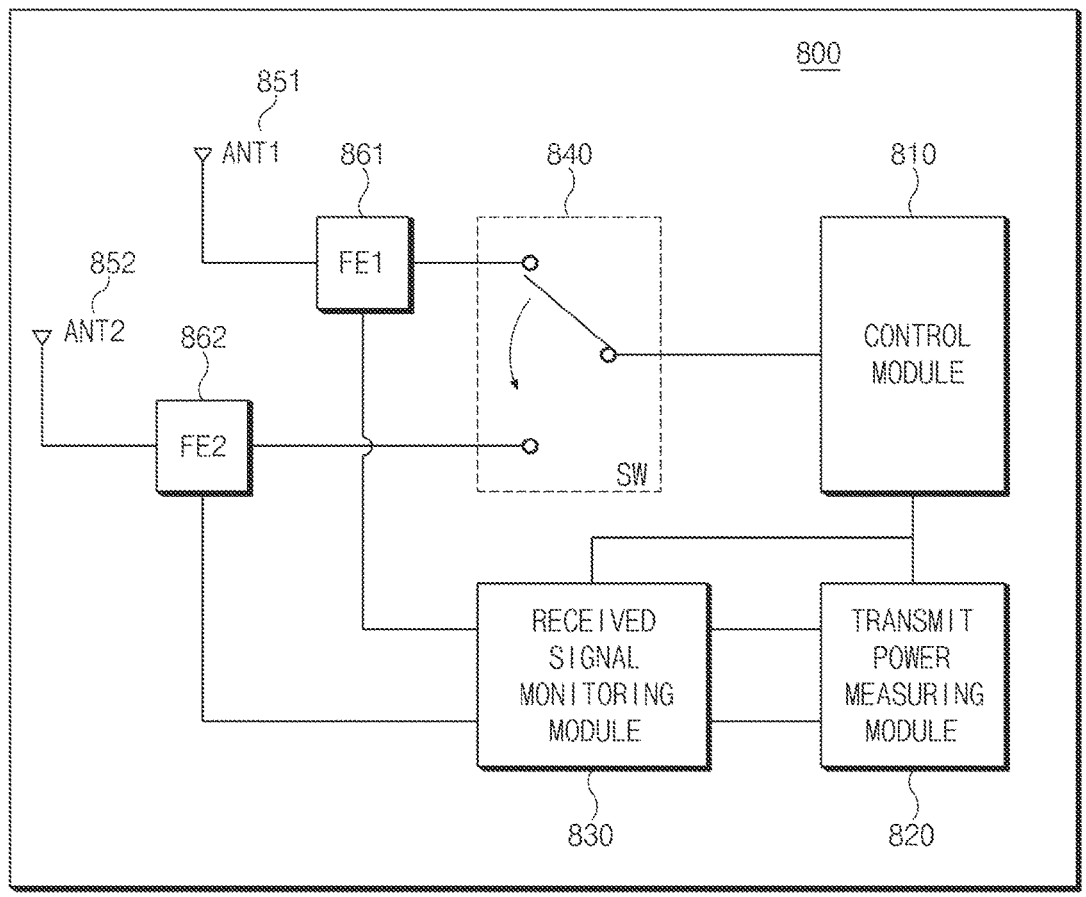
FIG. 8 is a block diagram illustrating an electronic device providing antenna switching according to various embodiments of the present disclosure.

FIG. 8 illustrates an electronic device providing the antenna switching according to various embodiments of the present disclosure. The electronic device illustrated in FIG. 8 may implement the antenna switching described in relation to FIGS. 2 to 7. Hereinafter, overlapped, similar or corresponding description may be omitted.

Referring to FIG. 8, an electronic device 800 may include a control module 810, a transmit power measuring module 820, a received signal monitoring module 830, a switching module 840, a first antenna 851, a first front end (FE) 861, which may be referred to as FE1 861, a second antenna 852, and a second FE 862, which may be referred to as FE2 862. In FIG. 8, configuration modules for describing operations according to various embodiments of the present disclosure are conceptually illustrated, and the implementation of the electronic device 800 may be variously modified. In addition, although the electronic device 800 is illustrated as including two antennas, the second antenna 852 may be at least one antenna not performing a transmit function, and therefore, the electronic device 800 may be extended to include three or more antennas. Various additional modules that may be included in the electronic device 800 are described later with reference to FIG. 9.

Referring to FIG. 8, the first antenna 851 may operate as a transmitting antenna. Information, e.g., reception strength or reception quality, etc., for a signal received by the first antenna 851 through the first FE 861 may be provided to the received signal monitoring module 830. Corresponding operations may be performed by the second antenna 852 and the second FE 862.

In various embodiments of the present disclosure, the transmit power measuring module 820 may monitor transmit power and a transmit power variation of the transmitting antenna. The switching module 840 may perform switching to the first antenna 851 according to the control of the control module 810 to allow the first antenna 851 to perform a transmission function. The transmit power measuring module 820 may measure the transmit power of the first antenna 851 and the variation thereof. Since the second antenna 852 does not perform the transmission function, transmit power and a variation thereof may be measured as 0. In various embodiments of the present disclosure, the transmit power measuring module 820 may not be connected to a plurality of antennas and may be implemented to be connected to an antenna, and the control module, performing the transmit function by the switching.

In various embodiments of the present disclosure, the switching module 840 may switch a transmitting antenna from one antenna, e.g., the first antenna 851, to another antenna, e.g., the second antenna 852, according to a control signal by the control module 810.

In various embodiments of the present disclosure, the control module 810 may perform control so that the switching module 840 switches the transmitting antenna based on a characteristic comparison result of signals received by the first and second antenna 851 and 852 and monitored by the received signal monitoring module 830.

Figure 9:
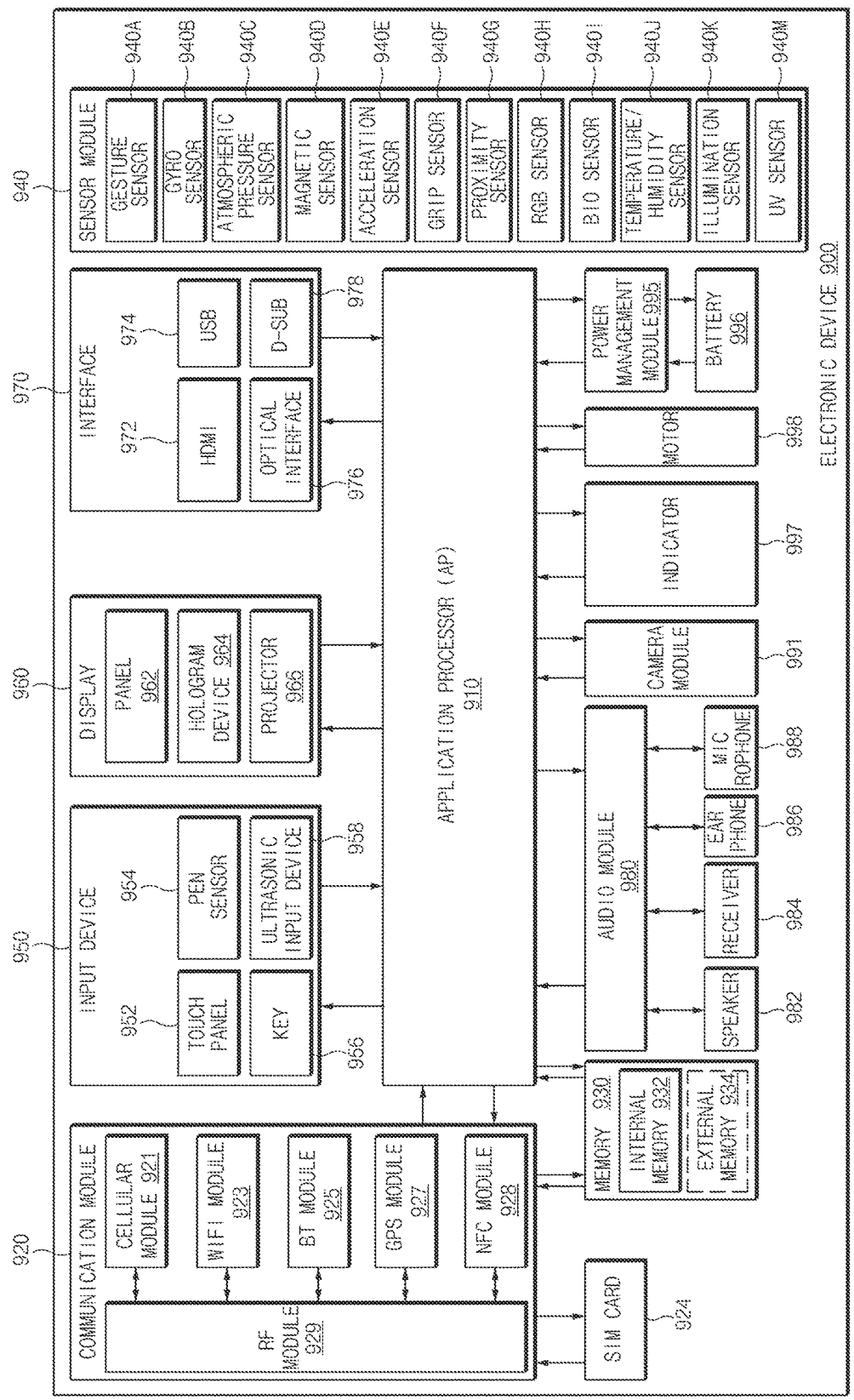
FIG. 9 illustrates a hardware configuration of an electronic device according to various embodiments of the present disclosure.

FIG. 9 illustrates a hardware configuration of the electronic device according to various embodiments of the present disclosure.

Referring to FIG. 9, the electronic device 900 may include at least one of an application processor (AP) 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, or a motor 998.

The AP 910, e.g., the control module 810, may drive an operating system or an application program and control a plurality of hardware or software elements connected thereto, and may perform various data processing and operations including multimedia data. The AP 910 may be implemented with, for example, a system on chip (SoC). According to an embodiment of the present disclosure, the AP 910 may further include a graphic processing unit (GPU) (not shown).

The communication module 920, e.g., the antennas 851 and 852, and the FEs 861 and 862, may perform data transmission and reception in communication between the electronic device 900 and other electronic devices connected through a network. According to an embodiment of the present disclosure, the communication module 920 may include a cellular module 921, a Wi-Fi module 923, a Bluetooth (BT) module 925, a GPS module 927, a near field communication (NFC) module 928, and a radio frequency (RF) module 929.

The cellular module 921 may provide a voice call, a video call, a text messaging service, or an internet service, etc., through a communication network, e.g., LTE, LTE-advanced (LTE-A), code division multiple access (CDMA), wideband CDMA (WCDMA), universal mobile telecommunications system (UMTS), wireless broadband (WiBro), or global system for mobile communications (GSM), etc. In addition, the cellular module 921 may identify or authenticate an electronic device in a communication network by using, for example, a SIM, e.g., the SIM card 924. According to an embodiment of the present disclosure, the cellular module 921 may perform at least a part of functions enabled by the AP 910. For example, the cellular module 921 may perform at least a part of multimedia control function.

According to an embodiment of the present disclosure, the cellular module 921 may include a communication processor (CP) and/or may be referred to as a CP. In addition, the cellular module 921 may be implemented with, for example, SoC. Although, in FIG. 9, the elements such as the cellular module 921, e.g., the CP, the memory 930 and the power management module 995 are illustrated as separate from the AP 910, according to an embodiment of the present disclosure, the AP 910 may be implemented to include at least some, e.g., the cellular module 921, of the above-described elements.

According to an embodiment of the present disclosure, the AP 910 or the cellular module 921, e.g., the CP, may load, on a volatile memory, commands or data received from at least one of a nonvolatile memory and other elements and process them. Furthermore, the AP 910 or the cellular module 921 may store, in the nonvolatile memory, data received from or created by at least one of other elements.

The Wi-Fi module 923, the BT module 925, the GPS module 927 or the NFC module 928 may respectively include, for example, a processor for processing data transmitted or received through the corresponding module. Although, in FIG. 9, the cellular module 921, the Wi-Fi module 923, the BT module 925, the GPS module 927 or the NFC module 928 are illustrated as each separate block, according to an embodiment of the present disclosure, at least some, e.g., at least two, of them may be included in a single integrated chip (IC) or an IC package. For example, at least some, e.g., a CP corresponding to the cellular module 921 and a Wi-Fi processor corresponding to the Wi-Fi module, of processors respectively corresponding to the cellular module 921, the Wi-Fi module 923, the BT module 925, the GPS module 927 or the NFC module 928 may be implemented as one SoC.

The RF module 929 may transmit and receive data, for example, an RF signal. Although not shown in the drawing, the RF module 929 may include, for example, a transceiver, a power amp module (PAM), a frequency filter, or a low noise amplifier (LNA), etc. In addition, the RF module 929 may further include components, for example, a conductor or a wire for transmitting and receiving an electromagnetic wave in a free space in a wireless communication. In FIG. 9, although the cellular module 921, the Wi-Fi module 923, the BT module 925, the GPS module 927 and the NFC module 928 are illustrated as sharing one RF module 929, according to an embodiment, at least one selected from the cellular module 921, the Wi-Fi module 923, the BT module 925, the GPS module 927 and the NFC module 928 may transmit and receive an RF signal through a separate RF module.

The SIM card 924 may be a card including a SIM and may be inserted into a slot formed at a specific position of the electronic device. The SIM card 924 may include unique identification information, e.g., an integrated circuit card identifier (ICCID), or subscriber information, e.g., an international mobile subscriber identity (IMSI).

The memory 930 may include an internal memory 932 or an external memory 934. The internal memory 932 may include at least one selected from, for example, a volatile memory, e.g., a dynamic random access memory (DRAM), a static RAM (SRAM), a synchronous DRAM (SDRAM) etc., or a nonvolatile memory, e.g., a one time programmable read only memory (OTROM), a programmable ROM (PROM), an erasable and programmable ROM (EPROM), an electrically erasable and programmable ROM (EEPROM), a mask ROM, a flash ROM, a NAND flash memory, a NOR flash memory etc.).

According to an embodiment of the present disclosure, the internal memory 932 may be a solid state drive (SSD). The external memory 934 may further include a flash drive, for example, a compact flash (CF), a secure digital (SD), a micro-SD, a mini-SD, an extreme digital (xD), or a memory stick. The external memory 934 may be functionally connected to the electronic device 900 through various interfaces. According to an embodiment of the present disclosure, the electronic device 900 may further include a storage device or storage medium like a hard drive.

The sensor module 940 may measure a physical quantity or detect an operating state of the electronic device 900, and convert the measured or detected information into an electrical signal. The sensor module 940 may include at least one of, for example, a gesture sensor 940A, a gyro sensor 940B, an atmospheric pressure sensor 940C, a magnetic sensor 940D, an acceleration sensor 940E, a grip sensor 940F, a proximity sensor 940G, a red, green, and blue (RGB) sensor 940H, a bio sensor 940I, a temperature/humidity sensor 940J, an illumination sensor 940K, and an ultra violet (UV) sensor 940M. The sensor module 940 may further include a control circuit for controlling at least one sensor therein.

The input device 950 may include a touch panel 952, a pen sensor 954, a key 956, or an ultrasonic input device 958. The touch panel 952 may recognize a touch input in at least one selected from capacitive, pressure-sensitive, infra-red ray, and surface acoustic wave type. In addition, the touch panel 952 may further include a control circuit (not shown). In case of capacitive type, physical contact or proximity recognition is possible. The touch panel 952 may further include a tactile layer. In this case, the touch panel 952 may provide a tactile reaction to the user.

The pen sensor 954 may be implemented by using, for example, a method identical or similar to receiving a user's touch input or a separate recognition sheet. The key 956 may include, for example, physical buttons, or optical keys or a keypad. The ultrasonic input device 958 may be a device able to detect a sound wave through a microphone, e.g., a microphone 988, and confirm data in the electronic device 900 through an input tool generating an ultrasonic wave signal, and may be a device that wireless awareness is possible. According to an embodiment of the present disclosure, the electronic device 900 may receive a user input from an external device, e.g., a computer or server, by using the communication module 920.

The display 960 may include a panel 962, a hologram device 964 or a projector 966. The panel 962 may be, for example, a liquid crystal display (LCD) or an active-matrix organic light-emitting diode (AMOLED). The panel 962 may be implemented as, for example, flexible, transparent or wearable. The panel 962 may be configured as one module with the touch panel 952. The hologram device 964 may show a stereoscopic image in the air by using interference of lights. The projector 966 may display an image by projecting a light on a screen. The screen may be located, for example, inside or outside the electronic device 900. According to an embodiment of the present disclosure, the display 960 may further include a control circuit (not shown) for controlling the panel 962, the hologram device 964, or the projector 966.

The interface 970 may include, for example, a high-definition multimedia interface (HDMI) 972, a universal serial bus (USB) 974, an optical interface 976, or a D-sub-miniature (D-sub) 978. Additionally or alternatively, the interface 970 may include, for example, a mobile high-definition link (MHL) interface (not shown), an SD card/multimedia card (MMC) interface (not shown), or an infrared data association (IrDA) specification interface (not shown).

The audio module 980 may convert sound into an electrical signal, or vice versa. The audio module 980 may process sound information input from or output to, for example, a speaker 982, a receiver 984, an earphone 986 or the microphone 988.

The camera module 991 is a device for capturing a still image or a video, and, according to an embodiment of the present disclosure, may include at least one image sensor, e.g., a front side sensor or a rear side sensor, a lens (not shown), an image signal processor (ISP) (not shown), or a flash (not shown), e.g., an LED or xenon lamp.

The power management module 995 may manage power of the electronic device 200. Although not shown in the drawing, the power management module 995 may include, for example, a power management IC (PMIC), a charger IC, or a battery or a fuel gauge.

The PMIC may be embedded, for example, in an IC or inside an SoC. A charging scheme may be divided into a wireless and wired scheme. The charging IC may charge the battery and block inflow of over-voltage or over-current from a charger. According to an embodiment of the present disclosure, the charging IC may include a charging IC for at least one of a wired charging scheme or a wireless charging scheme. As the wireless charging scheme, for example, there is a magnetic resonance scheme, inductive coupling scheme, or microwave scheme. An additional circuit, for example, a coil loop, resonance circuit, or rectifier, etc., may be further included for wireless charging.

The battery gauge may measure, for example, a remnant amount of the battery 996, voltage, current or temperature while in charging. The battery 996 may store or generate electricity and supply power to the electronic device 900 using the stored or generated electricity. The battery 996 may include, for example, a rechargeable battery or solar battery.

The indicator 997 may display a specific state of the electronic device 900 or a part thereof, e.g., the AP 910, for example, a booting state, messaging state or charging state, etc. The motor 998 may convert an electrical signal into a mechanical vibration. Although not shown in the drawing, the electronic device 900 may include a processing device, e.g., a GPU, for supporting a mobile TV. The processing device for supporting the mobile TV may process media data complying with specifications such as digital multimedia broadcasting (DMB), digital video broadcasting (DVB), or media flow, etc.

Each of the above-described elements according to various embodiments of the present disclosure may be configured with one or more components, and a name of a corresponding element may vary according to a kind of electronic device. An electronic device according to various embodiments of the present disclosure may be configured with at least one element among the above-described elements and some elements may be omitted or additional other elements may be further included. Furthermore, some of elements of an electronic device according to various embodiments of the present disclosure may be combined to be one entity and perform the same functions as those of corresponding elements before the combination.

A term "module" used herein may mean, for example, a unit including a combination of one or two or more of hardware, software, or firmware. A "module" may be interchangeably used with a term, for example, a unit, logic, logical block, component, or circuit. A "module" may be a minimum or a part of unit of a component configured into one. A "module" may be a minimum or a part of unit performing one or more functions. A "module" may be implemented mechanically or electronically. For example, a "module" according to the specification may include at least one selected from an application-specific IC (ASIC) chip, field-programmable gate arrays (FPGAs), and programmable-logic device which perform certain operations and are already known or to be developed.

According to various embodiments of the present disclosure, the communication module 920 may include the first antenna 851, the second antenna 852, the first FE 861, and the second FE 862. In addition, the communication module 920 may include the received signal monitoring module 830 or the switching module 840. According to various embodiments of the present disclosure, the AP 910 may correspond to the control module 810. The AP 910 may perform the function of the transmit power measuring module 820.

According to various embodiments of the present disclosure, the electronic device 800 or 900 may include a plurality of antennas including an antenna functioning as a transmitting antenna, a transmit power measuring module measuring the transmit power of the transmitting antenna, a received signal monitoring module monitoring characteristics of signals received by the plurality of antennas, an antenna switching module for switching the transmitting antenna to another antenna, and a control module allowing the antenna switching module to switch the transmitting antenna to the other antenna based on a result of comparing the characteristics of the received signals with each other, when a variation of the transmit power is not smaller than a threshold value. In addition, the transmit power measuring module may measure the transmit power variation based on power control information and scheduling information for at least one channel.

According to various embodiments of the present disclosure, at least a part of devices, e.g., modules or functions thereof, or methods, e.g., operations, according to various embodiments of the present disclosure may be implemented as instructions stored in a computer-readable storage medium in the form of a programming module. In the case where the instructions are performed by at least one processor, e.g., the processor 910, the at least one processor may perform functions corresponding to the instructions. The computer-readable storage medium may be, for example, a memory 930. At least a part of the programming module may be implemented, e.g., executed, by the processor 910. At least a part of the programming module may include, for example, a module, program, routine, sets of instructions, or process for performing at least one function.

The computer-readable storage medium may include a magnetic medium, such as a hard disk, a floppy disk and a magnetic tape, an optical medium such as a compact disk ROM (CD-ROM) and a DVD, a magneto-optical medium, such as a floptical disk, and a hardware device configured to store and execute program instructions, e.g., programming module, such as a ROM, a RAM and a flash memory. The program instructions may include machine language codes made by compilers and high-level language codes that can be executed by computers using interpreters. The above-mentioned hardware may be configured to be operated as one or more software modules for performing operations of various embodiments of the present disclosure and vice versa.

The module or programming module according to various embodiments of the present disclosure may include at least one of the above-mentioned elements, or some elements may be omitted or other additional elements may be added. Operations performed by the module, the programming module or the other elements may be performed in a sequential, parallel, iterative or heuristic way. Furthermore, some operations may be performed in another order or may be omitted, or other operations may be added.

According to various embodiments of the present disclosure, since whether to switch an antenna is determined every time a TPC occurs, rapid antenna switching is performed and call drop occurrence can be reduced or eliminated.

In addition, according to various embodiments of the present disclosure, the electronic device can perform antenna switching by monitoring even a case where transmit power is improved by changing only the scheduling information without changing a power control, since power control information and scheduling information are used together for the antenna switching.

In addition, according to various embodiments of the present disclosure, when switching to a wrong antenna occurs, switching back to a previous antenna state can be performed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An antenna switching method of an electronic device, the antenna switching method comprising:
 measuring a transmit power variation of a first antenna based on at least one of transmit power control (TPC) received from a base station and uplink scheduling information;

monitoring characteristics of received signals of both the first antenna and a second antenna;

determining a comparison result by comparing the characteristics of the received signals of both the first antenna and the second antenna when the transmit power variation is greater than or equal to a threshold value; and switching a transmitting antenna based on at least the comparison result, wherein after the measuring of the transmit power variation and the monitoring of characteristics of the received signals are performed for a first period, the method further comprising:

monitoring the characteristics of the received signals of both the first antenna and the second antenna for a second period which is longer than the first period; and obtaining average values of the characteristics of the received signals monitored for the second period, wherein the switching of the transmitting antenna is performed further based on the comparison result and the average values of the characteristics of the received signal.

2. The method of claim 1, wherein the measuring of the transmit power variation comprises measuring the transmit power variation based on power control information and scheduling information for at least one channel.

3. The method of claim 2, wherein the measuring of the transmit power variation further comprises measuring the transmit power variation based on at least a part of uplink scheduling parameters included in the scheduling information.

4. The method of claim 2, wherein the at least one channel includes at least one of an uplink control channel and an uplink data channel.

5. The method of claim 2, wherein the at least one channel includes at least one of a physical uplink control channel (PUCCH) and a physical uplink shared channel (PUSCH) in a long term evolution (LTE) communication network.

6. The method of claim 1, wherein the monitoring of characteristics of the received signals is performed by measuring intensities or qualities of the received signals of both the first antenna and the second antenna.

7. The method of claim 1, wherein the characteristics of the received signals include at least one of a reference signal received power (RSRP), a received signal strength indicator (RSSI), and a reference signal received quality (RSRQ) of the received signals of both the first antenna and the second antenna.

8. The method of claim 1, wherein the switching of the transmitting antenna comprises:

maintaining the transmitting antenna as the first antenna when an intensity or a quality of the received signal of the first antenna is determined to be higher than an intensity or a quality of the received signal of the second antenna based on the comparison result; and switching the transmitting antenna from the first antenna to the second antenna when the intensity or the quality of the received signal of the second antenna is determined to be higher than an intensity or a quality of the received signal of the first antenna based on the comparison result.

9. The method of claim 1, further comprising:

determining whether the transmit power of the first antenna is greater than or equal to a threshold value; and determining a number of occurrences of a designated feedback received from a base station when the transmit power of the first antenna is greater than or equal to the threshold value of the transmit power, wherein the switching of the transmitting antenna may be further performed based on the comparison result and the number of occurrences of the designated feedback.

10. The method of claim 9, wherein the designated feedback is a hybrid automatic retransmit request-negative-acknowledgement (HARQ-NACK).

11. The method of claim 1, further comprising:

measuring a transmit power variation of the transmitting antenna after the switching of the transmitting antenna;

comparing current transmit power and a transmit power immediately before the switching of the transmitting antenna when the transmit power variation measured after the switching is increased by at least a designated power value; and switching the transmitting antenna back to the transmitting antenna used before the switching of the transmitting antenna based on the comparison result.

12. The method of claim 11, wherein the switching of the transmitting antenna back is performed when the current transmit power is higher than the transmit power immediately before the switching of the transmitting antenna by the designated power value.

13. The method of claim 1, wherein the measuring of the transmit power variation of the first antenna comprises measuring a transmit power of a physical uplink shared channel (PUSCH) and a transmit power of a physical uplink control channel (PUCCH).

14. An electronic device comprising:

a plurality of antennas configured to include an antenna functioning as a transmitting antenna; and at least one processor configured to:

measure a transmit power variation of the transmitting antenna based on at least one of transmit power control (TPC) received from a base station and uplink scheduling information, monitor received signal characteristics of signals received by the plurality of antennas, and switch the transmitting antenna to another antenna based on a comparison result of a comparison of the received signal characteristics when a variation of the transmit power is greater than or equal to a threshold value, wherein after the measuring of the transmit power variation and the monitoring of characteristics of the received signals are performed for a first period, the at least one processor is further configured to:

monitor the characteristics of the received signals of both the first antenna and the second antenna for a second period which is longer than the first period; and obtain average values of the characteristics of the received signals monitored for the second period, wherein the switching of the transmitting antenna is performed further based on the comparison result and the average values of the characteristics of the received signal.

15. The electronic device of claim 14, wherein the at least one processor is further configured to measure the variation of the transmit power based on power control information and scheduling information for at least one channel.

16. The method of claim 13, wherein the transmit power variation is obtained as:

$$\Delta_{PUCCH} = \sum_{1}^{N} TPC$$

where TPC denotes transmit power control.

17. The method of claim 13, wherein the transmit power variation is obtained as:

$$\Delta_{PUCCH} = \Sigma(P_{prv} - P_{new})$$

where $P_{prv}$ denotes a previous PUCCH transmit power and $P_{new}$ denotes a currently controlled PUCCH transmit power.

18. The method of claim 13, wherein the transmit power variation is obtained as:

$$\Delta P_{PUSCH} = \Sigma(P_{prv\_sel} - P_{new\_sel})$$

where $P_{prv\_sel}$ denotes a previous PUSCH transmit power generated by using the transmit control power and selected uplink scheduling information, and $P_{new\_sel}$ denotes currently controlled PUSCH transmit power.

19. The device of claim 14, wherein the transmit power variation is obtained as:

$$\Delta_{PUCCH} = \sum_{1}^{N} TPC$$

where PUCCH denotes a physical uplink control channel and TPC denotes transmit power control.

20. The device of claim 14, wherein the transmit power variation is obtained as:

$$\Delta_{PUCCH} = \Sigma(P_{prv} - P_{new})$$

where PUCCH denotes a physical uplink control channel, $P_{prv}$ denotes a previous PUCCH transmit power and $P_{new}$ denotes a currently controlled PUCCH transmit power.

21. The device of claim 14, wherein the transmit power variation is obtained as:

$$\Delta_{PUSCH} = \Sigma(P_{prv\_sel} - P_{new\_sel})$$

where PUSCH denotes a physical uplink shared channel, $P_{prv\_sel}$ denotes a previous PUSCH transmit power generated by using the transmit control power and selected uplink scheduling information, and $P_{new\_sel}$ denotes currently controlled PUSCH transmit power.

* * * * *